Nov. 15, 1927.

G. L. TARBOX 1,649,498

UNIVERSAL JOINT

Filed June 24, 1926

GURDON LUCIUS TARBOX
INVENTOR

ATTORNEY

Nov. 15, 1927.

G. L. TARBOX 1,649,498

UNIVERSAL JOINT

Filed June 24, 1926

GURDON LUCIUS TARBOX
INVENTOR

ATTORNEY

Nov. 15, 1927.

G. L. TARBOX 1,649,498

UNIVERSAL JOINT

Filed June 24, 1926

GURDON LUCIUS TARBOX
INVENTOR

BY
ATTORNEY

Patented Nov. 15, 1927.

1,649,498

UNITED STATES PATENT OFFICE.

GURDON LUCIUS TARBOX, OF NORTH PLAINFIELD, NEW JERSEY.

UNIVERSAL JOINT.

Application filed June 24, 1926. Serial No. 118,306.

My invention relates to universal joints such as may be used to connect rotatable power shafts of all kinds, and particularly to universal joints used on propeller shafts of automobiles, and has for its object to provide a commercial ring type joint that will be capable of withstanding the incidents of use and one that will retain the lubricant within the ring against the action of centrifugal force. Further and more limited objects of the invention will appear in the specifications and will be realized in and through the combination of elements as set forth in the claims.

In the drawings, Figure 1 represents a transverse view in part section of a universal joint embodying my invention.

Figure 1:
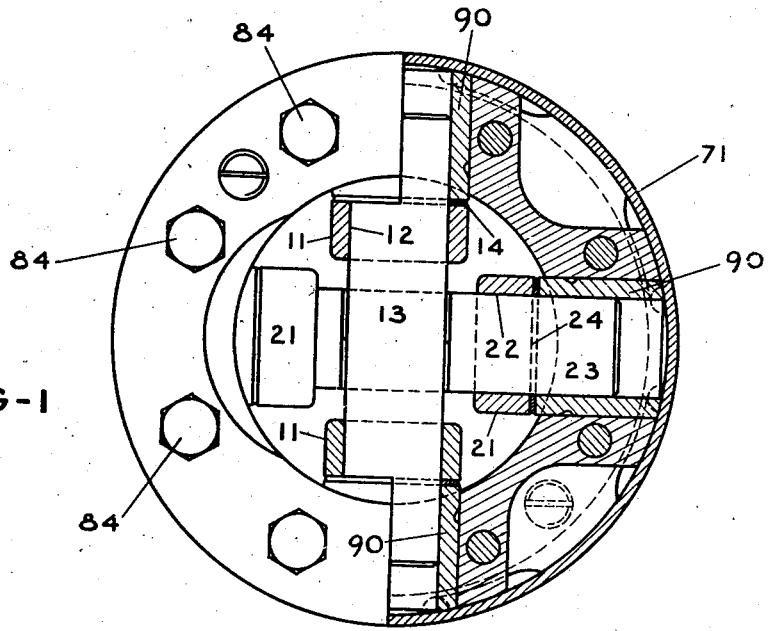
Figure 2:
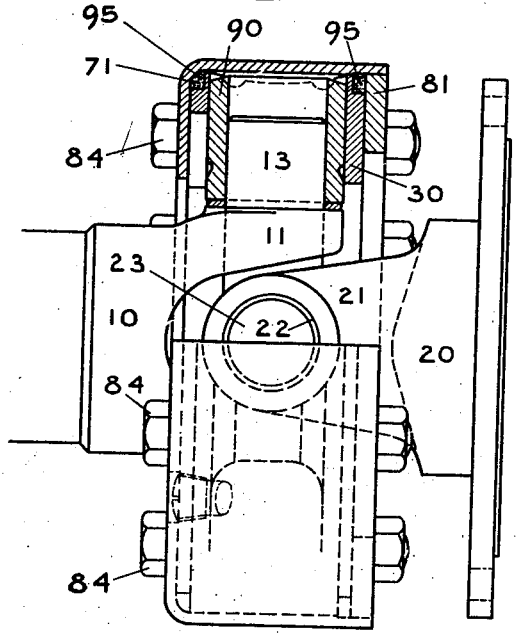
Figure 2 is a longitudinal elevation in part section thereof.
Figure 3:
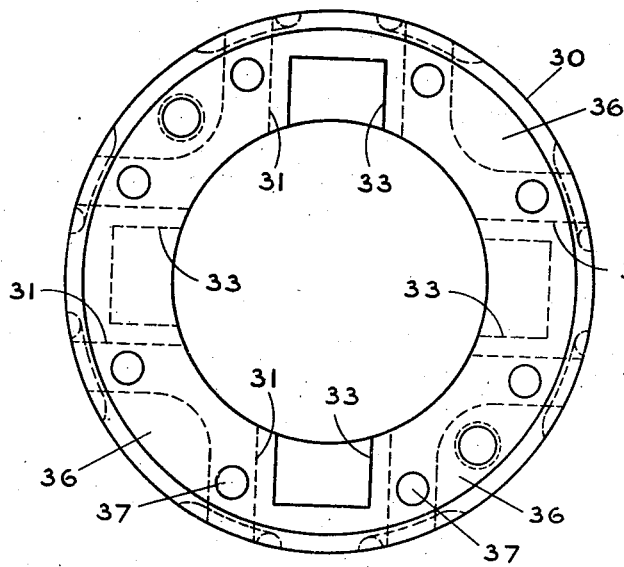
Figure 3 is a side view of my torque ring.
Figure 4:
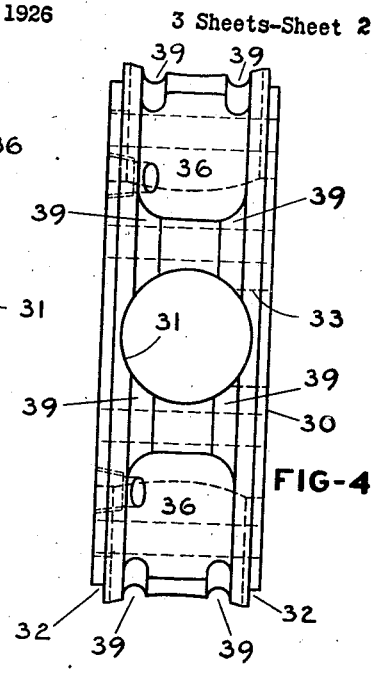
Figure 4 is a side view of my torque ring at right angles to that shown in Figure 3.
Figure 5:
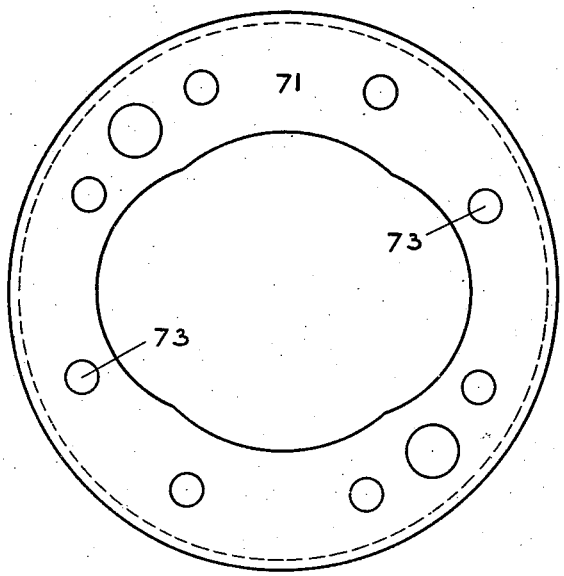
Figures 5 and 6 are two views of my casing taken at right angles to each other.
Figure 6:
Figure 7:
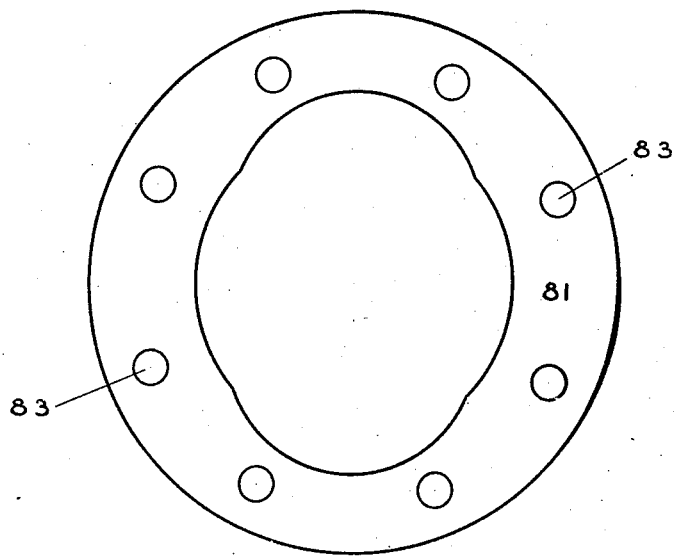
Figure 7 is a side view of my retaining ring.
Figures 8, 9:
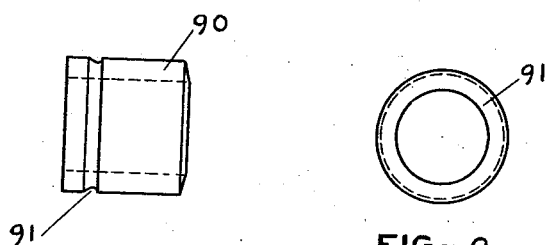
Figures 8 and 9 are two views of my bushing taken at right angles to each other.

Describing the various parts by reference characters and in connection with Figures 1 to 9 inclusive 10 and 20 denote hubs, connected respectively to driving and driven shafts, not shown, the hubs being provided with yokes 11 and 21 each having through holes 12 and 22 to receive the trunnion pins 13 and 23 with a driving fit. These trunnions are cut away in the center to avoid interference during angular operation of the joint. It will be observed that with the construction shown shoulders 14 and 24 are provided at each side of the yokes surrounding the base of the trunnions to provide a thrust surface.

In the construction shown I provide a torque ring 30 provided with four radial holes 31 and two annular packing grooves 32 continuing around the periphery of the ring. The holes 31 are cut away on their sides forming the slots 33 extending to alternate sides of the ring, two of such slots are on one side of the ring and two on the opposite sides. These slots are just long enough and wide enough to permit the trunnion pins slipping into place.

Recesses 36 are provided in the periphery of the torque ring 30 which provide the inner side of lubricant containing chambers the opening being furnished by the wall 70 of the casing 71. The casing 71 is provided with a plurality of holes 73 which register with holes 37 in torque ring 30 and holes 83 in retaining ring 81 through which bolts 84 may be passed to hold the assembly together.

Bushings 90 are provided which are adapted to fit tightly in the seats 31 in the torque ring 30 the annular slot 91 being provided as a means to knock the bushings out of the seats upon taking the assembly apart.

It will be observed that the bushings 90 extend beyond the ends of the trunnions but do not close the space directly under the casing thus permitting the lubricant to flow from the lubricant containing chambers 36 to the bearings providing complete circulation of oil around the inside of the casing. Two channels 39 are provided in the torque ring to connect the lubricant chamber with the seats for the bushings.

Two annular packing rings 95 are inserted in the continuous annular packing slots 32 provided in the torque ring which when encased in the casing form a continuous oil sealed joint thereby preventing leakage due to centrifugal force as will be readily understood.

The casing and retaining ring are provided with oval openings to permit them to straddle the trunnions for the purpose of assembly.

The assembly of the joint is as follows: The trunnion pins 13 and 23 are driven in the holes provided in the hubs 10 and 20 and the retaining ring 81 and casing 71 are slipped over the ends of the trunnions, one over the driving trunnions and one over the driven trunnions. The trunnions are then slid into position from opposite sides of the torque ring through the slots 33 so that when the bushings 90 are driven into the seats 31 they will engage the trunnions and furnish bearings therefor. The packing rings 71 are then inserted in the continuous packing grooves 32 and the casing 71 and retaining ring 81 are then bolted tightly together by means of bolts 84.

It will be observed that the packing rings make a completely continuous tight joint between the torque ring and the casing so that oil will be retained in the lubricant chamber.

I wish it distinctly understood that my universal joint herein described is in the form in which I desire to construct it but that changes or variations may be made as may be convenient or desirable without departing from the salient features of my invention and I therefore intend the following claims to cover such modifications as naturally fall within the lines of invention.

I claim:

1. In a universal joint the combination with a driving and driven member and trunnions carried thereby, a torque ring provided with radial seats, entrance slots on the side thereof extending part way through the ring and on alternate sides thereof, and two annular packing grooves in the periphery thereof, annular packing rings within the grooves, and bushings held within the radial seats forming bearings for the trunnions.

2. In a universal joint the combination with a driving and driven member and trunnions carried thereby, a torque ring provided with radial seats and opposed slots to permit the trunnions to be inserted within the seats, bushings held within the seats provided with annular grooves to permit removal from seats, annular packing grooves on each side of the torque ring to hold packing rings, and a casing adapted to enclose the torque ring and compress the packing to seal the joint between the torque ring and casing on both sides of the torque ring.

GURDON LUCIUS TARBOX.